(12) United States Patent
Langsdorf et al.

(10) Patent No.: US 7,000,429 B2
(45) Date of Patent: Feb. 21, 2006

(54) ROLLER TABLE FOR CARRYING AND TRANSPORTING A HOT GLASS BAND

(75) Inventors: Andreas Langsdorf, Ingelheim (DE); Thomas Kraus, Nieder-Olm (DE); Hans-Joachim Witte, Wiesbaden (DE)

(73) Assignee: Schott AG, Mainz (DE)

( * ) Notice: Subject to any disclaimer, the term of this patent is extended or adjusted under 35 U.S.C. 154(b) by 471 days.

(21) Appl. No.: 10/227,090

(22) Filed: Aug. 23, 2002

(65) Prior Publication Data

US 2003/0037573 A1 Feb. 27, 2003

(30) Foreign Application Priority Data

Aug. 24, 2001 (DE) ................................ 101 41 498

(51) Int. Cl.
*C03B 35/14* (2006.01)
*C03B 35/24* (2006.01)
(52) U.S. Cl. ........................ 65/25.3; 65/158; 65/159; 65/182.2; 65/253; 65/370.1; 198/780
(58) Field of Classification Search ................ 65/25.2, 65/25.3, 158, 159, 182.2, 253, 370.1; 198/780
See application file for complete search history.

(56) References Cited

U.S. PATENT DOCUMENTS

| | | | | |
|---|---|---|---|---|
| 735,048 | A | * | 8/1903 | Appert ...................... 65/182.2 |
| 798,642 | A | * | 9/1905 | Wadsworth .................... 65/81 |
| 1,608,644 | A | * | 11/1926 | Black .......................... 65/185 |
| 3,615,315 | A | | 10/1971 | Michalik et al. ............ 65/25 A |
| 3,961,927 | A | * | 6/1976 | Alderson et al. ............ 65/25.1 |
| 4,081,260 | A | | 3/1978 | Glikman et al. ............ 65/25 A |
| 6,799,438 | B1 | * | 10/2004 | Herzbach et al. ............ 65/25.3 |

FOREIGN PATENT DOCUMENTS

JP 2000-119033 * 4/2000

* cited by examiner

*Primary Examiner*—Sean Vincent
(74) *Attorney, Agent, or Firm*—Baker & Daniels

(57) ABSTRACT

A roller table for supporting and transporting a hot glass strand. A plurality of rollers arranged parallel to each other and perpendicular to the transport direction of the glass strand are capable of being selectively rotated in the direction of transport of the glass strand. At least some of the rollers are sleeves, the casings of which are which are gas-permeable on at least a portion of their surfaces and the casings are provided with a supply of pressurized gas which is emitted through the openings of the gas-permeable surfaces.

17 Claims, 2 Drawing Sheets

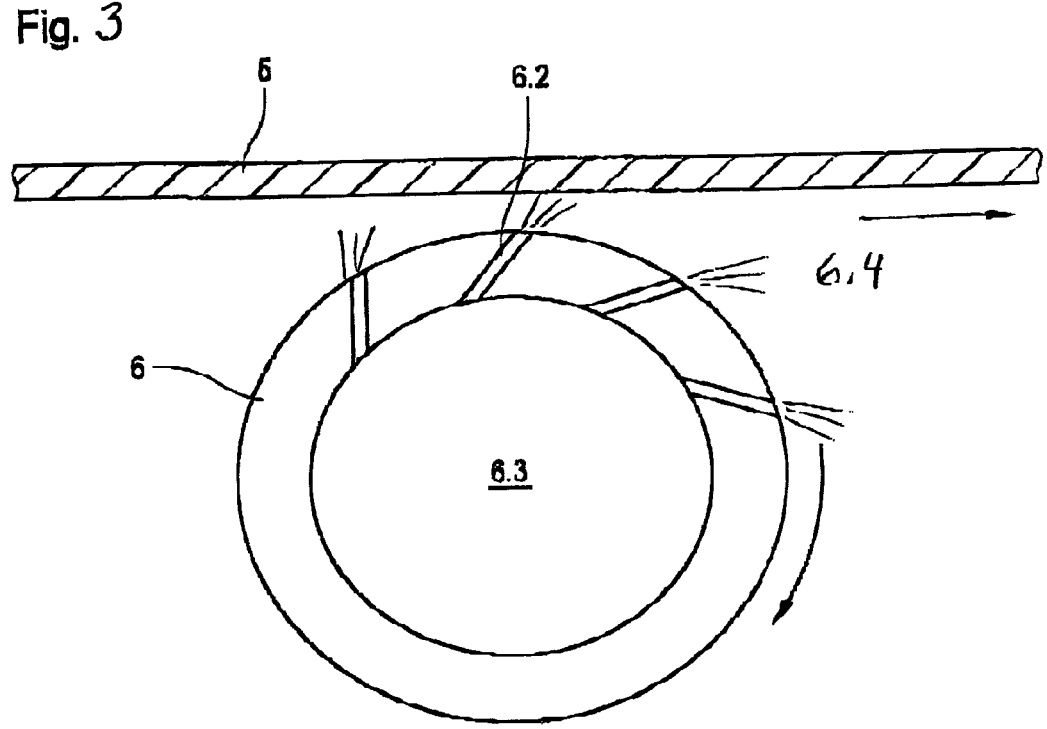

ROLLER TABLE FOR CARRYING AND TRANSPORTING A HOT GLASS BAND

BACKGROUND OF THE INVENTION

The invention concerns the field of glass processing, in particular, the field of the production of glass strands, such as in band form.

Glass bands are produced based on different processes. Roller pairs can be provided that are arranged in a defined manner with respect to each other and form an opening with each other, through which the glass band passes with the purpose of shaping. A float bath can also be provided.

As soon as the glass band has been shaped, it must be fed to a subsequent cooling furnace for controlled cooling. For this, a larger distance must be traveled. Rollers, a large number of which are arranged parallel to each other and perpendicular to the conveyor direction of the glass band, serve to lead and transport the glass band. The rollers are driven about their own axes. The glass band lies on these rollers. Due to the contact between the lateral surfaces of the rollers and the glass band, the rollers exert a transport effect on the glass band.

The glass of the glass band is hot on its transport path, and consequently plastic, and its surface is sensitive to damage. Thus, contact with the numerous rollers can lead to damage to the glass surface. The area between the shaping and entrance into the cooling furnace is particularly critical, since the glass is still very hot. As a rule, a roller arrangement called the "roller table" is located in this area. Hereby, for example, the firmness of the glass band can be decreased. In order to avoid this, measures must be taken that increase the firmness but that do not affect the structure of the glass in an undesired manner.

U.S. Pat. Nos. 3,615,315 and 4,081,260 describe a float process. In this process, the roller table is replaced by an air-cushion table. This avoids damage to the surface of the glass.

One disadvantage is that air cushion created by the air-cushion table exerts alone a carrying function, but not a transport function. Thus, the glass band must be transported by other means. For this reason, roller pairs are used that are either present in front of or in the furnace. The glass band is fed through the two rollers of a roller pair, hereby harnessed and pulled through the rotation of the rollers of a roller pair. The pull effect can also be exerted exclusively by the rollers located under the glass band.

As long as the glass band is intact, the pull of the pulling roller pair arranged in front of or in the furnace is sufficient. But, the glass band can come off its transport path due to its low firmness or due to certain interventions in the process at a certain point. The front section in the longitudinal direction is fed through the named roller pair into and through the cooling furnace. However, the treatment of the section, which has a glass-band beginning (leading edge portion), located behind the fracture in the longitudinal direction is problematic. A pull must be manually attached to this glass-band beginning in order to feed it into the cooling furnace to the pulling roller pair that is located there, where a pull is exerted on the beginning of the glass band and thus on the entire "new" glass band. This is extraordinarily costly; it costs time and means production downtime.

SUMMARY OF THE INVENTION

The purpose of the invention is to design a roller table for carrying and transporting a band-shaped glass strand such that previous expenditures are decreased or avoided, which previously needed to be overcome when breakages occurred. In particular, it should be ensured that a longitudinal pull is immediately exerted on the new strand beginning created after the breakage. In any case, damage to the surface of the glass strand should be avoided.

The fundamental characteristics of the solution based on the invention consist in that at least several rollers of the roller table are sleeves, the hollow inner space of which can be connected to a compressed gas and the casings of which have boreholes for the outflow of compressed gas.

There are several options for designing the named basic ideas of the invention.

One such option consists in not driving the sleeve-like rollers with gas connection or compressed gas connection during normal operation, i.e., if the glass strand is fed freely and undamaged to the cooling furnace. However, gas, such as air, is supplied to the interior of the relevant rollers and flows out of the boreholes. The boreholes only extend over a part of the circumference of the roller, i.e., over one area that is facing the glass strand. The gas streams carry the glass strand; the pull function is performed by the aforementioned roller pair in front of or in the cooling furnace.

Should the glass strand break, the rotation of the rollers is shifted, in such a manner that a surface element of the casing surface of the individual rollers moves in the glass-strand area in the transport direction of the glass strand. This leads to contact between the casing surface of the rollers and the glass strand. This contact occurs in that the area of the roller casing surface without gas flowing through it faces the glass strand in that the gas supply is shut off during the breakage. By friction, this contact leads to a transport of the glass strand with its new glass-strand beginning in the direction of the cooling furnace. The laborious work of the manual transport of the glass-strand beginning to the cooling furnace is thus avoided.

This contact occurs in that the area without gas flowing through it of the roller casing points against the glass strand in that the gas supply is shut off during the breakage. By friction, this contact leads to a transport of the glass strand with its new glass-strand beginning in the direction of the cooling furnace. The laborious work of the manual transport of the glass-strand beginning to the cooling furnace is thus avoided.

A breakage of the glass strand can be recorded by a sensor. The sensor creates a signal that can be used as a command to turn on the actuation of the rollers.

With this alternative, it can also optionally be provided that the casing surface is flattened and that only the flattened part of the casing of the sleeve-shaped pipe is provided with boreholes. Thereby, a two-dimensional support effect of the glass strand is achieved by the gas padding.

The casing of the individual pipe sleeves does not necessarily need to be provided with boreholes. Grooves are also suitable. A particularly interesting option is to create certain casing areas from an open-pore membrane material.

BRIEF DESCRIPTION OF THE DRAWINGS

Embodiments of the invention are explained in more detail based on the drawings. The following is described therein:

FIG. 3 Shows the axial-vertical section of an additional roller.

DETAILED DESCRIPTION

Figure 1:
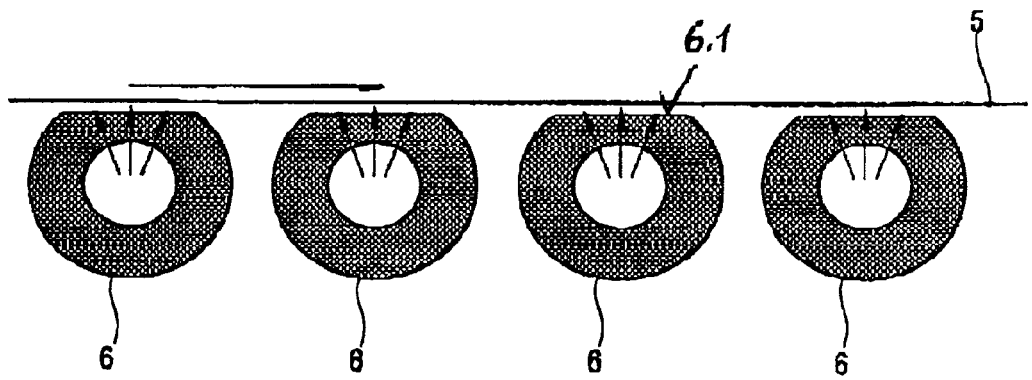
FIG. 1 Shows the side view of a glass strand with supported rollers under normal operating conditions.
Figure 2:
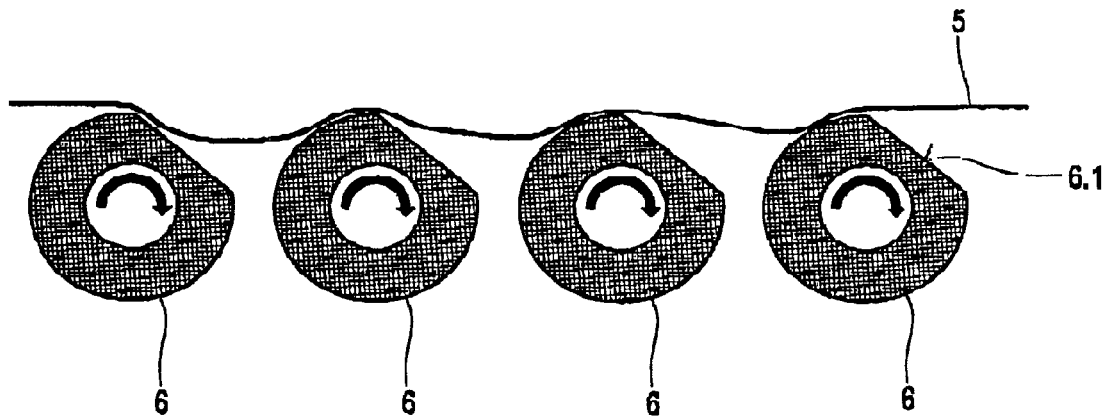
FIG. 2 Shows the subject of FIG. 1 in emergency operating conditions after a breakage.

With the designs based on FIGS. 1 and 2, the casing surfaces of rollers 6 are flattened to provide a planar surface—see surface 6.1. In the area of this surface, the casings of the individual rollers are bored through so that a guiding connection between the inner space of the bushing-shaped roller 6 and surface 6.1 is created. In this manner, a gas cushion is built between surface 6.1 and glass strand 5. Under normal operation conditions, as portrayed in FIG. 1, an intact glass strand 5 is present. It is fed by a pulling roller pair that is not represented here and that is located downstream into and through a non-portrayed cooling furnace. Surfaces 6.1 thus have the effect of type of air-cushion table. Contact between individual rollers 6 and glass strand 5 does not take place and thus the surface of glass strand 6 is not compromised. This ensures the high quality of the surface of the glass.

The particular advantage of the invention can be seen in the case of strand breakage. See FIG. 2. In this case, rotation of the rollers is initiated—see arrow. Strand 5 falls against rollers 6 so that contact between strand 5 and the casing surface of roller 6 takes place. Based on this contact, the rollers now exert a pulling effect on the new strand beginning (leading edge portion), to be precise, as long as strand 5 is fed far enough into the cooling furnace. Then the aforementioned pull roller pair can again take over the transport function. The rollers are turned in the direction shown in FIG. 1, stopped in this position, and charged with compressed gas.

The flattening of rollers 6 leads to glass strand 5 performing an up and down movement. This damages the surface of glass strand 5. This only occurs for a short period of time and production downtime is thus low. Through an eccentric support of rollers 6, the up and down movement of strand 5 is avoided. In the area of the transition between surface 6.1 and the round casing surface of each roller 6, a radius can be provided so that sharp edges can be avoided.

The rollers can be made of porous sintered material, porous ceramic, or graphite. But, they can also be made of massive material that is provided with appropriate boreholes or grooves.

The flattened area can be formed using another material. It is also possible to provided the entire casing with different types of perforations, which is easy to do during production, but to cover the casing of the individual rollers—except surface 6.1—with a foil or something similar on the inside or outside.

Depending on the permeability of the areas with gas flowing through them, for example, blast air or compressed air can be used.

A cooling of rollers 6 can be appropriate.

The roller displayed in FIG. 3 includes boreholes 6.2. These create a guiding connection between the hollow interior space 6.3 and the outer environment. The hollow inner space 6.3 is connected to a source of compressed air that is not described here.

Notice the direction of the rotation of roller 6 and the transport direction of the glass strand 5. During the rotation of roller 6, compressed air streams 6.4 emerge from boreholes 6.2. These bounce against the lower surface of glass strand 5. Since the compressed air streams 6.4 still have a rotation based on the turning of roller 6, a corresponding pulling power is exerted on glass strand 5, which contributes to its transport. This also applies to a breakage of glass strand 5 so that a resulting new strand beginning continues to be transported with the subsequent glass strand section.

The pulling effect is supported by the portrayed secant-like series of boreholes 6.2.

The invention claimed is:

1. A roller table for supporting and transporting a hot glass strand in a transport direction, comprising:
   a plurality of rollers arranged parallel to each other with their axes oriented perpendicularly to the transport direction of the glass strand, said rollers being rotatable about their respective axes;
   at least some of said rollers being sleeves having casing portions comprising a planar surface extending over the length of the respective roller and being parallel to the respective roller axis, said casing portions being gas permeable over at least a portion of their planar surfaces;
   said some rollers having a gas supply connection communicating with the gas-permeable casing portions, whereby a gas cushion can be created underneath a glass strand above the surfaces of the roller casing portions;
   said rollers being selectively rotatably drivable.

2. A roller table for supporting and transporting a hot glass strand in a transport direction, comprising:
   a plurality of rollers arranged parallel to each other with their axes oriented perpendicularly to the transport direction of the glass strand, said rollers being rotatable about their respective axes;
   at least some of said rollers being sleeves having casing portions which are gas-permeable over at least a portion of their surfaces;
   said some rollers having a gas supply connection communicating with the gas-permeable casing portions, whereby a gas cushion can be created underneath a glass strand above the surfaces of the roller casing portions;
   said rollers being selectively rotatably drivable; and
   a sensor system that records breakages in the glass strand and feeds an appropriate signal to drives for the rollers during a breakage.

3. A roller table for supporting and transporting a hot glass strand in a transport direction, comprising:
   a plurality of rollers arranged parallel to each other with their axes oriented perpendicularly to the transport direction of the glass strand, said rollers being rotatable about their respective axes;
   at least some of said rollers being sleeves having casing portions which are gas-permeable over at least a portion of their surfaces;
   said some rollers having a gas supply connection communicating with the gas-permeable casing portions, whereby a gas cushion can be created underneath a glass strand above the surfaces of the roller casing portions;
   said rollers being selectively rotatably drivable;
   wherein the casing portions have boreholes or grooves that are oriented as secants as seen from an axial-vertical view.

4. A roller table for supporting and transporting a hot glass strand in a transport direction, comprising:
   a plurality of rollers arranged parallel to each other with their axes oriented perpendicularly to the transport direction of the glass strand, said rollers being rotatable about their respective axes;

at least some of said rollers being sleeves having casing portions which are gas-permeable over at least a portion of their surfaces;

said some rollers having a gas supply connection communicating with the gas-permeable casing portions, whereby a gas cushion can be created underneath a glass strand above the surfaces of the roller casing portions;

said rollers being selectively rotatably drivable; and wherein the rollers are at least partially made of an open-pore material.

5. A roller table in accordance with claim 1, wherein a sensor system is provided that records breakages in the glass strand and feeds an appropriate signal to drives for the rollers during a breakage.

6. A roller table in accordance with claim 1, wherein drives are assigned to the rollers and the drives selectively cause rotation of the rollers.

7. A roller table in accordance with claim 1, wherein the casing portions have boreholes or grooves that are oriented as secants as seen from an axial-vertical view.

8. A roller table in accordance with claim 1, wherein the rollers are at least partially made of an open-pore membrane material.

9. A roller table in accordance with claim 1, wherein the gas permeable portions of the casings have boreholes or grooves.

10. A roller table in accordance with claim 2, wherein the gas permeable portions of the casings have boreholes or grooves.

11. A roller table in accordance with claim 5 wherein the gas permeable portions of the casings have boreholes or grooves.

12. A roller table in accordance with claim 6 wherein the gas permeable portions of the casings have boreholes or grooves.

13. A roller table in accordance with claim 2, wherein the rollers are at least partially made of an open-pore membrane material.

14. A roller table in accordance with claim 3, wherein the rollers are at least partially made of an open-pore membrane material.

15. A roller table in accordance with claim 5 wherein the rollers are at least partially made of an open-pore membrane material.

16. A roller table in accordance with claim 6 wherein the rollers are at least partially made of an open-pore membrane material.

17. A roller table in accordance with claim 4, wherein the rollers are at least partially made of an open-pore membrane material.

* * * * *

UNITED STATES PATENT AND TRADEMARK OFFICE
CERTIFICATE OF CORRECTION

PATENT NO. : 7,000,429 B2
DATED : February 21, 2006
INVENTOR(S) : Langsdorf et al.

It is certified that error appears in the above-identified patent and that said Letters Patent is hereby corrected as shown below:

<u>Title page,</u>
Item [57], ABSTRACT,
Line 6, delete "which are".

Signed and Sealed this

Twenty-fifth Day of April, 2006

JON W. DUDAS
*Director of the United States Patent and Trademark Office*